Nov. 14, 1967  G. K. MEGLA  3,352,619
LECHER-LINE CRYSTAL LIGHT MODULATOR
Original Filed Oct. 1, 1962
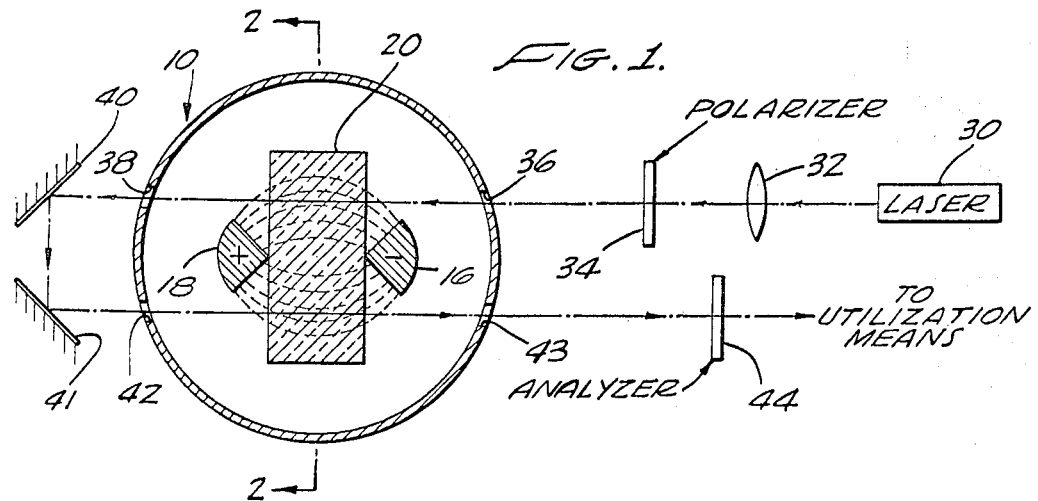
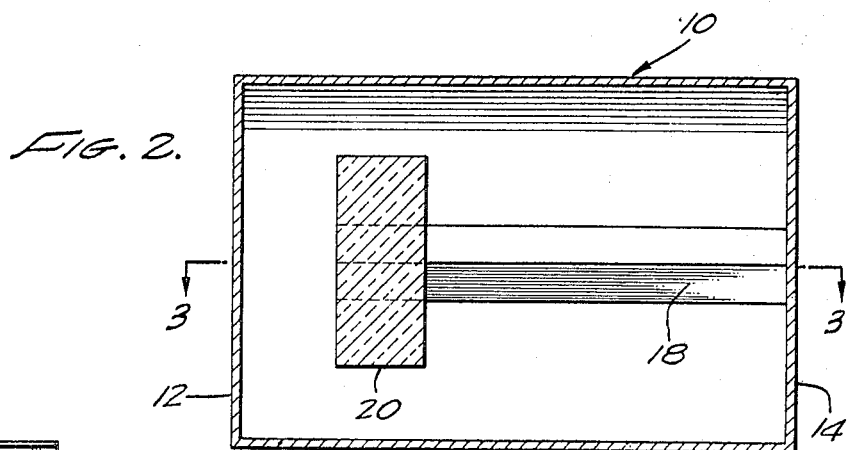
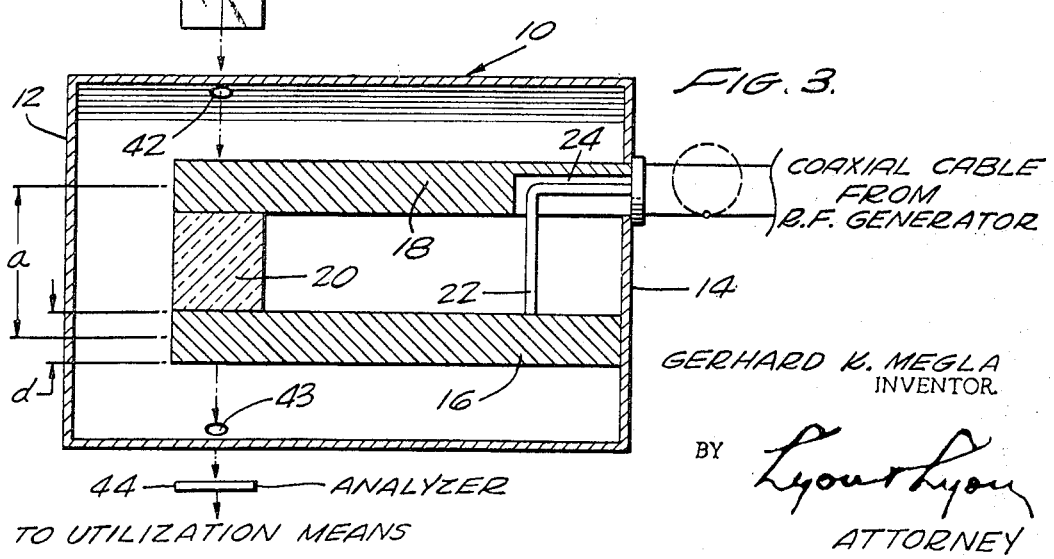
GERHARD K. MEGLA
INVENTOR.
BY
ATTORNEY

United States Patent Office 3,352,619
Patented Nov. 14, 1967

3,352,619
LECHER-LINE CRYSTAL LIGHT MODULATOR
Gerhard K. Megla, Raleigh, N.C., assignor to Hoffman Electronics Corporation, a corporation of California
Continuation of application Ser. No. 227,181, Oct. 1, 1962. This application Apr. 27, 1966, Ser. No. 545,680
13 Claims. (Cl. 350—150)

This application is a continuation of my copending application Ser. No. 227,181, filed Oct. 1, 1962, now abandoned.

The present invention relates to an improved light modulator system and apparatus, and it relates more particularly to an improved light modulator which is capable of changing the output intensity of a linearly polarized light beam from a light source, such as a laser.

The modulated light beam produced by the system of the invention has particular utility in communication systems. Since the laser represents a single frequency light source of appreciable power which can be focused into a beam of highly parallel light rays, one of its applications will lie in communications on earth and over large distances in free space.

The light modulator to be described herein is particularly capable of intensity modulating a polarized light beam at microwave frequencies so as to have utility in communication systems. The light modulator of the present invention is of the general type which utilizes a crystal in a resonant cavity. In accordance with the concepts of the invention, a dihydrogen phosphate crystal, for example, is placed in a microwave cavity resonator in the region of maximum electrical field strength. This provides a light modulator with particularly high modulating efficiency.

When polarized light is passed through a crystal, such as of the type mentioned above, the plane of polarization of the light rotates by an amount which is dependent upon the voltage applied to the crystal, parallel to the light path. This rotation is known as the Pockels effect. The rotation can be converted into intensity modulation when the light beam emerging from the crystal is passed through an analyzer such as Nicol prism.

A description of the above-mentioned Pockels effect can be found in an article by Bruce H. Billings in the Journal of the Optical Society of America, volume 39, No. 10, October 1949, entitled "The Electro-Optic Effect in Uniaxial Crystals of the Type $XH_2PO_4$."

Light modulators using the Pockels effect are known to the art. Such a modulator is described, for example, in an article "Microwave Modulation of the Electro-Optic Effect in $KH_2PO_4$," appearing in the Physical Review Letters, volume 6, No. 10, May 15, 1961, by I. P. Kaminow.

The Kaminow article describes a light modulator using a potassium dihydrogen phosphate ($KH_2PO_4$) (KDP) colorless transparent crystal. The crystal belongs to the tetragonal group which lacks a center of inversion and exhibits linear electro-optic effects. Ammonium dihydrogen phosphate ($NH_4H_2PO_4$) (ADP) crystals have also been used for this purpose.

The apparatus described in the Kaminow article includes a 25 watt zirconium concentrated arc lamp with a Corning 7–69 infrared filter peaked at 8000 A., as a light source. The subsequent advent of the laser, of course, provides a more appropriate light source for modulation.

The Kaminow apparatus also includes a Glan-Thompson polarizer, a crossed analyzer, and a photo-multiplier which converts the modulated light beam into an equivalent electrical signal for test purposes, the photo-multiplier being, for example, an RCA 7102 (S–1) tube. The light modulator of the Kaminow article includes a KDP crystal mounted in a cylindrical cavity resonator. In the described apparatus, the resonator is excited by a pulsed X-band magnetron.

The KDP crystal of the Kaminow article is mounted in the cavity resonator in coaxial relationship with the resonator, and a light beam from the arc lamp is passed through the polarizer and along the axis of the resonator to pass through the crystal. The polarizer polarizes the light beam in one direction. The light beam emerging from the resonator is directed to an analyzer which, as mentioned above, is crossed with the polarizer so as to pass the polarized light beam with full intensity only upon a 90° shift of the plane of polarization, so that a modulated light beam is obtained by an appropriate control of the crystal. The efficiency of the apparatus described in the Kaminow article is relatively low because the cavity resonator is excited in a harmonic mode of operation ($TM_{013}$).

Light modulators similar to the apparatus described in the above-mentioned Kaminow article have been developed by the Sperry Gyroscope Corporation. The Sperry modulators are capable, for example, of modulating a light beam at frequencies ranging from 500 to 2,000 megacycles. The cavity resonator of the Sperry system is excited in the fundamental ($TM_{010}$) and the (TEM) modes. The modulator efficiency in the Sperry system is also relatively low, because the wall current at the center of the cavity resonator end plates is interrupted by holes which must be drilled in the end plates to allow the polarized light beam from the polarizer to pass through the cavity resonator and through the crystal therein. The interruption of the wall current in the cavity resonator causes a corresponding reduction in the field strength within the crystal.

It is an object of the present invention, therefore, to provide a novel light modulator.

It is another object of the present invention to provide a light modulator of the above-mentioned crystal-cavity resonator type, which is constructed so that higher modulating efficiency may be obtained as compared with the prior-art light modulating systems mentioned above.

The light modulator of the present invention is constructed so that maximum field strength in the cavity resonator is concentrated in the crystal. To achieve this condition, the invention embodies a modified microwave cavity resonator. The cavity resonator of the invention is so constructed that the field in the crystal is not disturbed or degraded by the apertures in the cavity resonator through which the light beam passes.

According to one embodiment of the present invention, a light modulator comprises a Lecher-type shielded two-conductor resonator. The crystal is mounted, as a capacitive load, between the conductors at the inner end of the Lecher resonator system, where field concentration occurs. The two conductors have a transverse segmental configuration, so that the major portion of the electric field lines penetrates into the crystal for maximum modulation efficiency. The crystal produces a phase retardation action on the polarized light beam passed through it, which action is used to obtain the desired intensity modulation effect and which action is controlled by the intensity of the field passing through the crystal.

An additional increase in the phase retardation of the light beam can be obtained in the system of the present invention by the use of mirrors. These mirrors are positioned so as to cause the light beam to pass twice through the crystal. Because of the two-fold reflection of the mirrors, the light beam is phase retarded after emerging from the crystal, and it re-enters the crystal with the same phase retardation to pass through the crystal a second time. This double passage produces the same effect on the light beam as if the crystal had twice its actual thickness. The phase retardation is proportional to the thickness of the crystal, so that further increased modulation efficiency is obtained by the double passage without any increase of field strength.

Further objects and advantages of the invention will become apparent from a consideration of the following description, when taken in conjunction with the accompanying drawings, in which:

FIGURE 1 is a schematic representation of the apparatus and system of one embodiment of the invention;

FIGURE 2 is a sectional view of the apparatus of FIGURE 1 taken substantially along the line 2—2 of FIGURE 1; and FIGURE 3 is a sectional view of the apparatus of FIGURE 2 taken along the line 3—3 of FIGURE 2.

The apparatus of the invention includes a screen 10 which is formed in the usual manner of an outer conductor having a cylindrical configuration, the ends of the screen being closed by appropriate end walls 12 and 14.

A pair of conductors 16 and 18 extend within screen 10 in spaced and parallel relationship, so as to form a part of a modified Lecher resonant system. Screen 10 shields the Lecher-type system to prevent radiation losses. All conducting parts are silver plated to obtain a high quality factor.

The conductors 16 and 18 terminate before reaching the end wall 12. A crystal 20 of the $XH_2PO_4$ type is mounted between the inner ends of the conductors 16 and 18. The crystal 20 may, for example, be an ADP or KDP dihydrogen phosphate crystal. The positioning of the crystal at the inner ends of the conductors 16 and 18 causes the crystal to function as a capacitive load for electrical signals carried by the conductors and determines, therefore, its electrical length of a quarter wavelength.

The resonator system is matched to the output resistance of the exciting generator by a bar 22 which is free to slide within groove 24 in conductor 18 and extends between the conductors, as shown, and which may be moved back and forth for matching purposes in any appropriate manner. Once the optimum coupling point along conductor 16 is determined, bar 22 can be welded to conductor 16.

The resulting light modulator consists of a two-conductor modified Lecher-type resonator, and this resonator is excited in the first quarter-wave mode (TEM wave). The two conductor resonator can be excited in a push-pull manner from an associated radio frequency modulating signal source, such as a magnetron. Thus, bar 22 and conductor 18 can be connected to an R.F.-generator by means of a coaxial cable.

As best shown in FIGURE 1, the conductors 16 and 18 have a transverse segmental configuration, so that a major portion of the electrical field lines penetrates into the crystal 20.

For a minimum wall current, the following ratios can be used:

$$\frac{D}{a} = 3.3$$

and $$\frac{a}{\frac{d}{2}} = 5.5$$

where D is the diameter of screen 10, $a$ is the distance between the axes of conductors 16 and 18, and $d$ is the width of conductors 16 and 18.

The light beam to be modulated by the system of the invention originates, for example, in a laser 30 or other appropriate light source. The laser 30 may be constructed in any manner known to the art, and it is capable of producing a highly coherent light beam having a low tendency towards divergence, as mentioned above. The light beam from the laser source 30 may be passed through a collimating lens 32, and it passes along a particular optical axis through a polarizer 34.

The polarizer 34 causes the light beam to be polarized in a particular direction. The resulting polarized light beam is directed through a pair of aligned apertures 36 and 38 in the side wall of the cavity resonator 10. The path of the polarized light beam is perpendicular to the axes of the conductors 16 and 18. As noted, the path of the polarized light beam is displaced to one side of the conductors 16 and 18. The apertures 36 and 38 have negligible effect on the wall currents of the cavity resonator such as would degrade the electric field passing through the crystal.

As noted above, an additional increase of the phase retardation action by the crystal on the light beam can be attained by the used of a pair of mirrors 40 and 41. These mirrors are arranged so that the light beam emerging through the aperture 38 is reflected back into the cavity 10 through a pair of aligned apertures 42 and 43, and also through the crystal 20.

As a result of the two-fold reflection at the mirrors (at each mirror a phase jump of 180° occurs); the light waves, which are phase retarded after emerging from the crystal and from the aperture 38 re-enter the cavity resonator with the same phase difference through the aperture 42 and pass through the crystal the second time. This, as mentioned above, has the same effect as if the crystal had a double thickness. As mentioned above, greater modulation efficiency is obtained in the system by the double-passage effect, without any need to increase the field strength in the cavity resonator.

The emerging light beam from the aperture 43 is passed through an analyzer 44. The analyzer 44, like the polarizer 34, may consist of a Nicol prism or a polaroid filter. Analyzer 44, however, is mounted so as to pass the polarized light beam from the polarizer 34 with full intensity only when the direction of polarization has been turned through 90°. An intensity modulation effect is achieved, therefore, on the light beam emerging from the analyzer. The resulting modulated light beam can be utilized in any desired manner.

The invention provides, therefore, an improved light modulator in which greatly increased modulation efficiency is achieved, as compared with the prior art modulators of the same general type.

While a particular embodiment of the invention has been shown and described, modifications may be made, and the appended claims are intended to cover all such modifications as fall within the scope of the invention.

I claim:
1. Light modulating apparatus, comprising:
   a polarized light source means,
   a Lecher-line resonant system including a pair of spaced and parallel electrical conductors, each of said conductors having an electrical length of an odd multiple of a quarter wavelength, and
   a crystal which exhibits the electro-optical effect mounted between said spaced electrical conductors as a capacitive load for receiving and modulating rays from said light source means.

2. Light modulating apparatus, comprising:
   a polarized light source means,
   a Lecher-line resonant system including a pair of spaced and parallel electrical conductors,
   a crystal which exhibits a linear electro-optical effect mounted between said spaced electrical conductors as a capacitive load for receiving and modulating rays from said light source means,
   signal generating means for exciting said resonant system, and
   means for optimizing the coupling between said signal generating means and said resonant system.

3. Light modulating apparatus comprising:
   a Lecher-line resonant system including a pair of spaced and parallel electrical conductors, each having an electrical length which is a multiple of a quarter wavelength, a crystal which exhibits a linear electro-optical effect mounted between said spaced electrical conductors as a capacitive load, signal generating means for exciting said resonant system whereby an electric field is established across said crystal, a light source, polarizing means, analyzing means, said light source, said polarizing means, said crystal and said analyzing means being optically arranged so that rays emanating from said source pass sequentially through said polarizing means, said crystal and said analyzing means.

4. The apparatus of claim 3 wherein a radiation shield is provided around said resonant system, said shield having apertures therein for permitting passage of said rays.

5. The apparatus of claim 3 wherein means are provided for reflecting said rays back into said crystal after they emerge therefrom along a path spaced from and parallel to the initial path.

6. The apparatus of claim 3 wherein said electrical conductors have respective longitudinal axes and said rays pass through said crystal along a path perpendicular to the longitudinal axes of said electrical conductors.

7. Apparatus as defined in claim 3 including, in addition, a pair of mirrors so positioned that said rays are caused to pass through said crystal twice.

8. Light modulating apparatus comprising:

a Lecher-line resonant system including a pair of spaced and parallel electrical conductors each having an electrical length of an odd multiple of a quarter wavelength, a crystal which exhibits a linear electro-optical effect mounted between said spaced electrical conductors as a capacitive load, radio frequency modulating signal source means for exciting said resonant system in a push-pull manner whereby an electrical field is established across said crystal, a light source, polarizing means, analyzing means, and said light source, said polarizing means, said crystal and said analyzing means being optically arranged so that rays eminating from said source pass sequentially through said polarizing means, said crystal and said analyzing means, and said rays are substantially parallel to said electric field across said crystal.

9. Light modulating apparatus as in claim 8 wherein said odd multiple is 1.

10. Light modulating apparatus comprising:

a Lecher-line resonant system including a pair of spaced and parallel electrical conductors, a crystal which exhibits a linear electro-optical effect mounted between said spaced electrical conductors as a capacitive load, signal generating means for exciting said resonant system whereby an electric field is established across said crystal, said conductors having a transverse configuration such that the major portion of the electrical field lines therefrom penetrate said crystal for maximum modulating efficiency, a light source, polarizing means, and analyzing means, said light source, said polarizing means, said crystal and said analyzing means being optically arranged so that rays emanating from said source pass sequentially through said polarizing means, said crystal and said analyzing means.

11. Light modulating apparatus comprising:

a Lecher-line resonant system including a pair of spaced and parallel electrical conductors, a crystal which exhibits a linear electro-optical effect mounted between said spaced electrical conductors as a capacitive load, signal generating means for exciting said resonant system whereby an electric field is established across said crystal, said conductors having a transverse segmental configuration to produce substantially maximum electrical field intensity in said crystal, a light source, polarizing means, and analyzing means, said light source, said polarizing means, said crystal and said analyzing means being optically arranged so that rays emanating from said source pass sequentially through said polarizing means, said crystal and said analyzing means.

12. Light modulating apparatus comprising a Lecher-line resonant system including a pair of spaced and parallel electrical conductors, a crystal which exhibits the electro-optical effect mounted between said spaced electrical conductors as a capacitive load, means for directing polarized light through said crystal, and analyzing means responsive to light that has passed through said crystal, and said conductors having a traverse configuration such that the major portion of the electric field lines therefrom penetrate said crystal for maximum modulating efficiency.

13. Light modulating apparatus comprising a Lecher-line resonant system including a pair of spaced and parallel electrical conductors, a crystal which exhibits the electro-optical effect mounted between said spaced electrical conductors as a capacitive load, means for directing polarized light through said crystal, and analyzing means responsive to light that has passed through said crystal, and said conductors having a traverse segmental configuration to produce substantially maximum electrical field intensity in said crystal.

No references cited.

JEWELL H. PEDERSEN, *Primary Examiner.*

R. L. WILBERT, *Assistant Examiner.*